Dec. 8, 1959   R. ZITO   2,916,289
IMPACT INDICATING SYSTEM
Filed Aug. 1, 1955   7 Sheets-Sheet 1
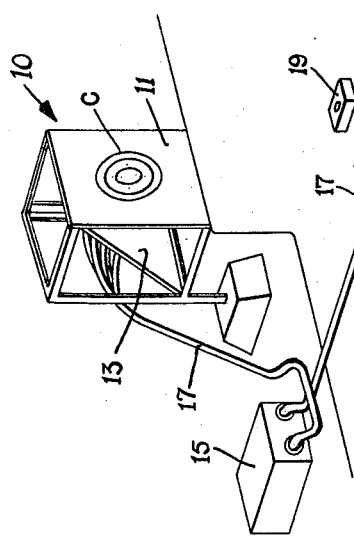
FIG. 1
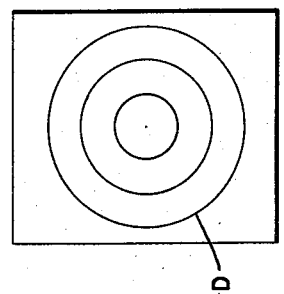
FIG. 1A
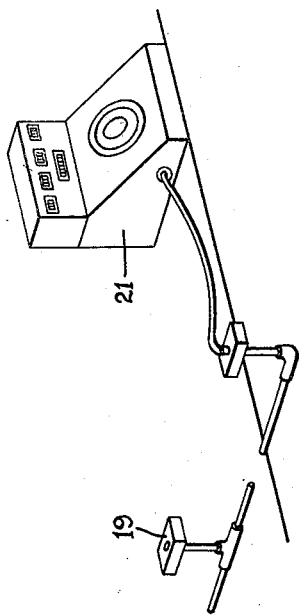
FIG. 1B
INVENTOR
RALPH ZITO
BY
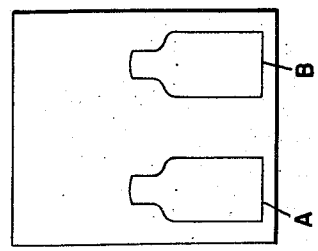
ATTORNEY Dec. 8, 1959                    R. ZITO                  2,916,289
                        IMPACT INDICATING SYSTEM
Filed Aug. 1, 1955                                  7 Sheets-Sheet 3
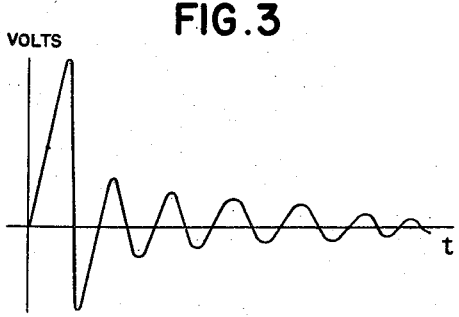
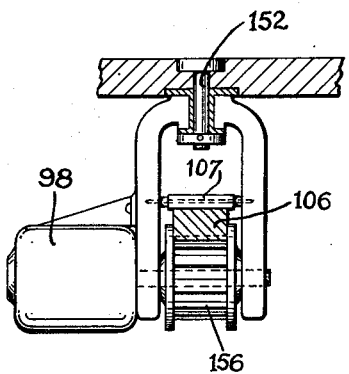
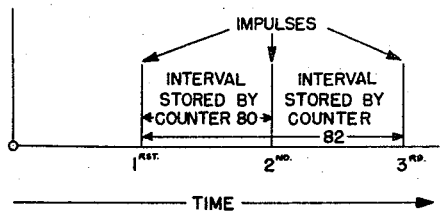
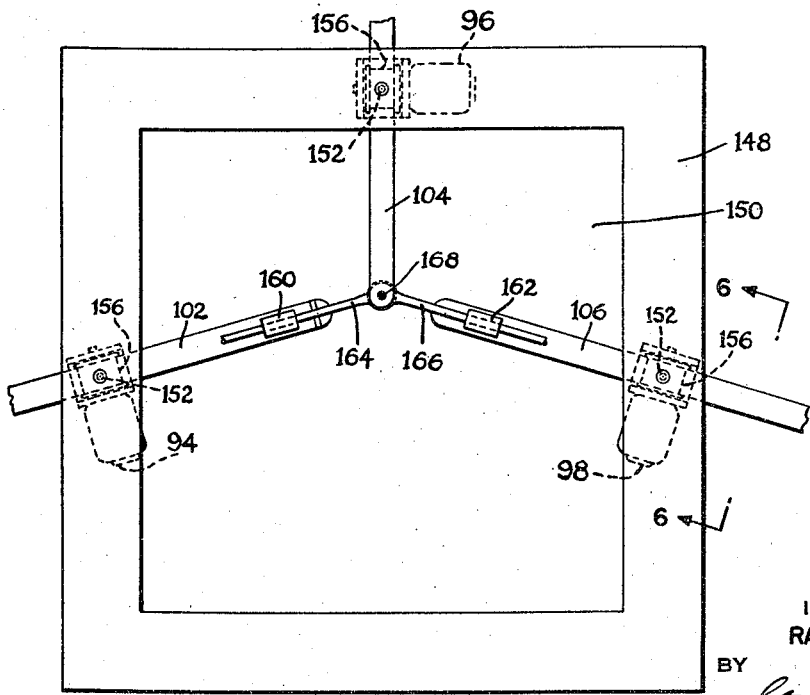
INVENTOR
RALPH ZITO
BY
ATTORNEY Dec. 8, 1959    R. ZITO    2,916,289
IMPACT INDICATING SYSTEM
Filed Aug. 1, 1955    7 Sheets-Sheet 4
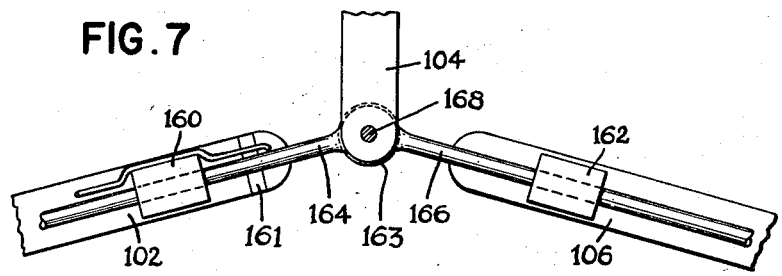
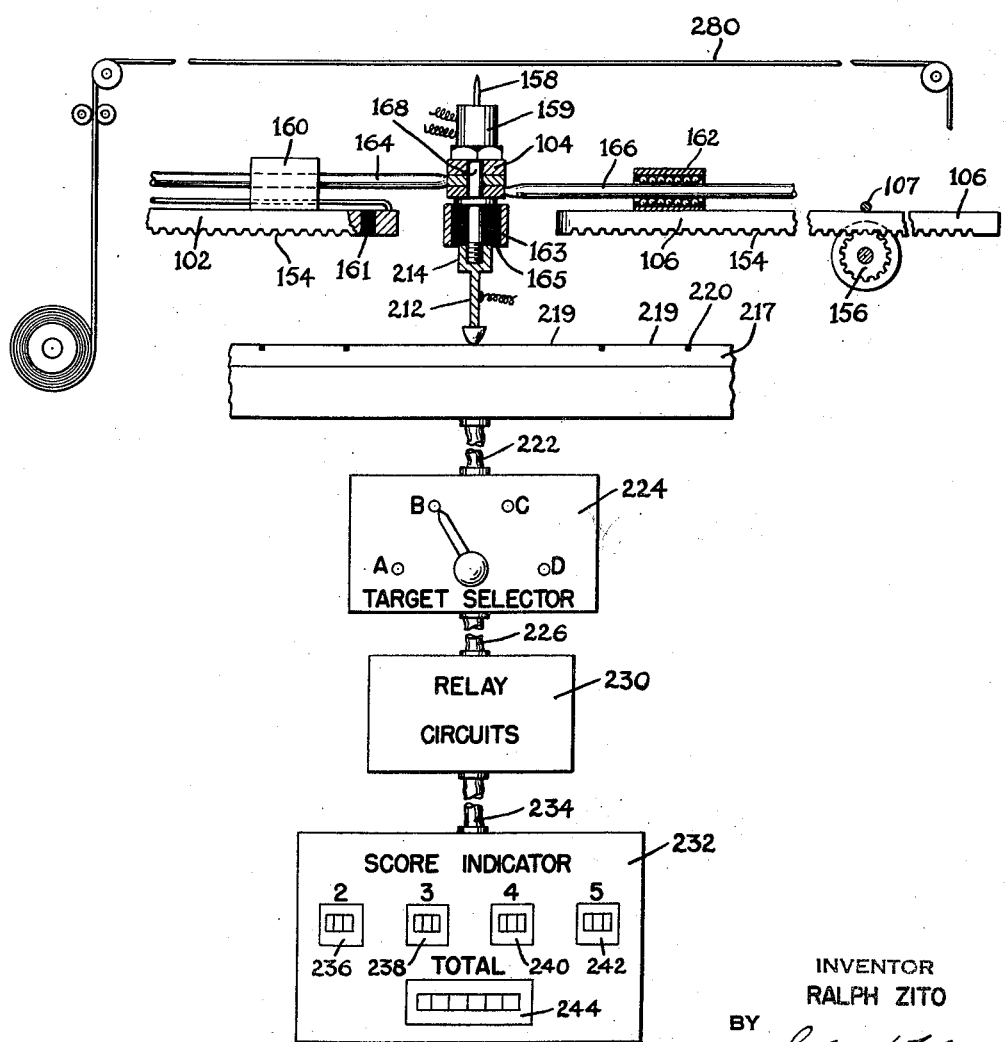
INVENTOR
RALPH ZITO
BY
*Stewart F. [Moore]*
ATTORNEY

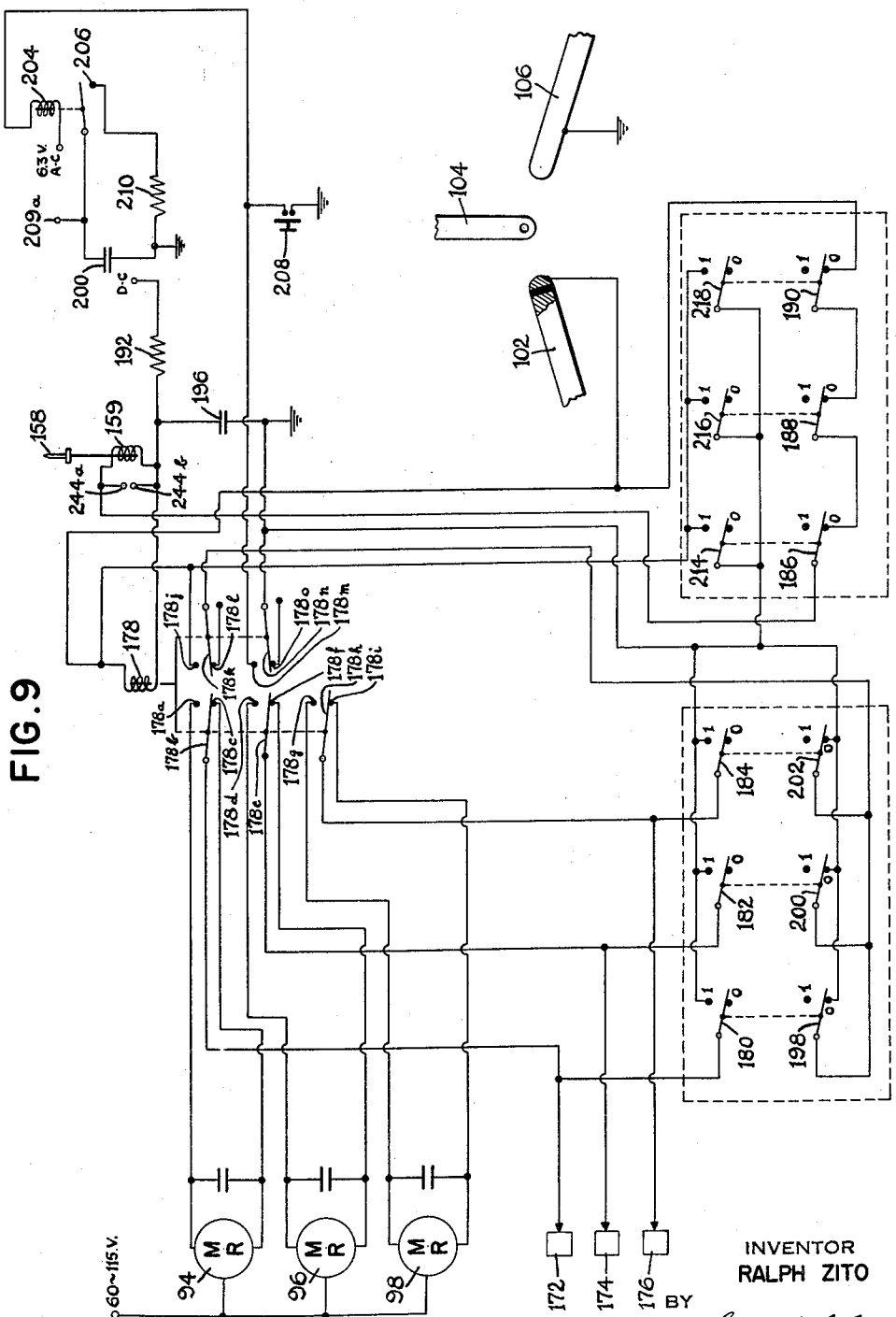

Dec. 8, 1959   R. ZITO   2,916,289
IMPACT INDICATING SYSTEM
Filed Aug. 1, 1955   7 Sheets-Sheet 7
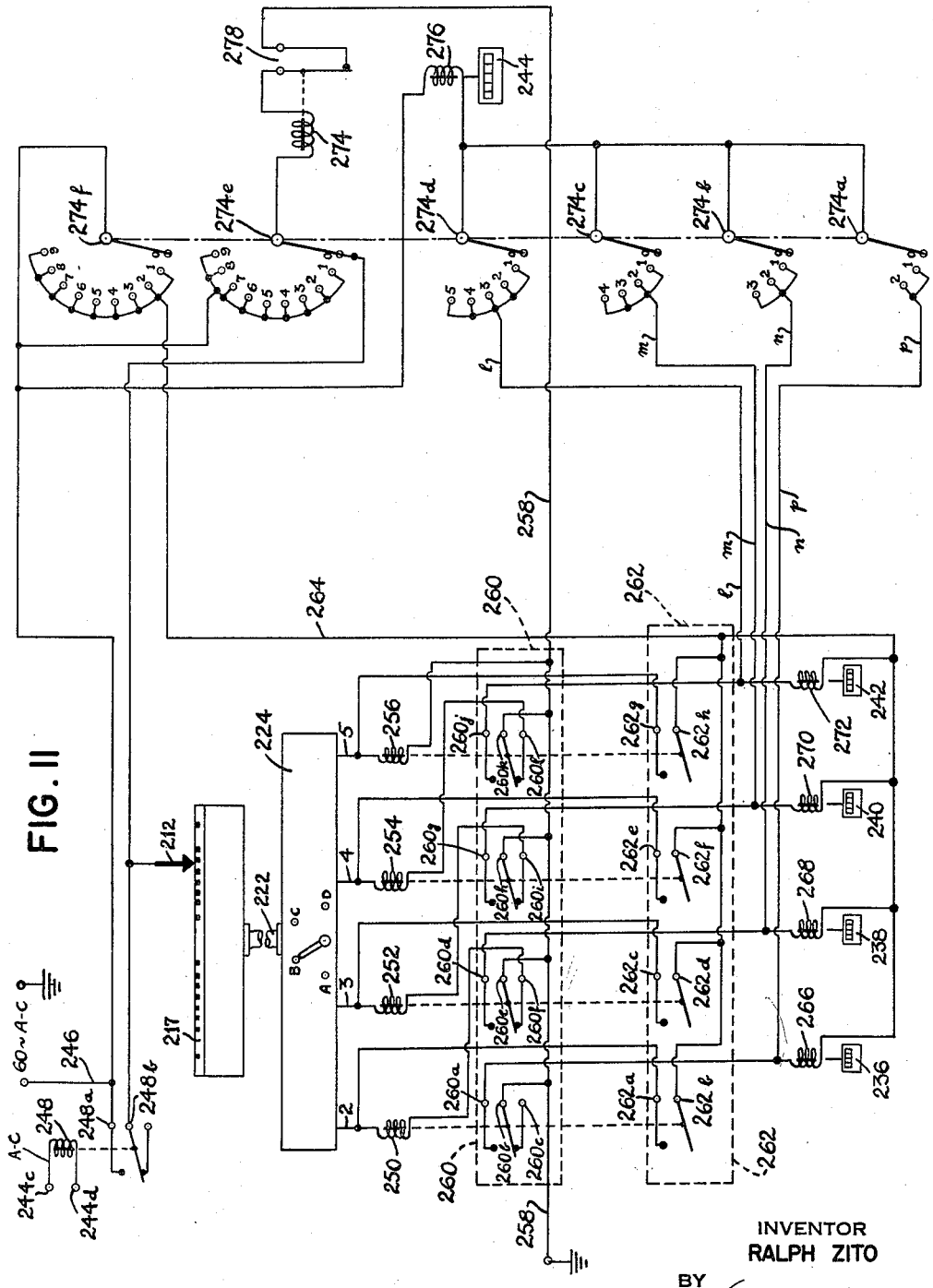
FIG. II
INVENTOR
RALPH ZITO
BY
ATTORNEY United States Patent Office 2,916,289
Patented Dec. 8, 1959

2,916,289

IMPACT INDICATING SYSTEM

Ralph Zito, Pelham, N.Y., assignor to American Machine & Foundry Co., a corporation of New York Application August 1, 1955, Serial No. 525,433

19 Claims. (Cl. 273—102.2)

This invention relates to an impact indicating system and more particularly to a system and apparatus for remotely indicating the location and score of projectile hits on a target.

In the training of military gunners and, in particular, in the training of riflemen, it is desirable to be able to indicate to the trainee the position and score of his hits upon a target. Heretofore, the only way of indicating hits has been to station personnel near the targets for examining the target after each shot, determining the position of the hit, and signaling to the trainee by spotting flags or other means the location of the hit.

Such a procedure is dangerous and time-consuming and inaccurate since it is often difficult to determine the position of a hit upon a target perforated with holes from previous hits.

It is, therefore, an object of the invention to provide a system for automatically recording and indicating the position of impact of each and every round of ammunition striking a target.

It is another object of the invention to provide a system for automatically recording and indicating the position of impact almost instantaneously after a projectile is fired.

It is a further object of the invention to provide a display of the location and score of each hit to the firer thereof in close proximity to him and remote from the target.

Another object of the invention is to provide a device for indicating the attained score of each hit and a cumulative total of the score achieved as firing upon a selected target progresses.

A further object of the invention is to provide a system responsive to sonic shock waves from impacts which translates the period of such shock waves into information for actuating a visual indication of said impact.

In accordance with the present invention, shock waves emanating from the impact of a projectile striking a hard surface are detected by vibration-responsive devices and the time relationships of each shock wave to each other, as measured between the point of impact and each detector position, are recorded and stored; these recorded times are expanded and the relative differences in magnitude therebetween are translated into data indicative of the distance of the point of impact from each of said detectors. Such data is further translated into signals for actuating apparatus which displays a facsimile of the target and the hits thereon. The display apparatus is located near the gunner and remotely from the point of impact.

For a better understanding of the invention, together with other and further objects thereof, reference is made to the following detailed description taken in connection with the accompanying drawings, in which:

Figure 1 is a general schematic illustration of the impact indicating system.

Figure 1A and Figure 1B show target patterns which may be substituted for the target pattern shown in Figure 1.

Figure 3 illustrates the shock wave form emanating from a point of impact.

Figure 4 shows the time relations stored by the counters of Figure 2.

Figure 5 is a plan view of the remote impact position and scoring indicator.

Figure 6 is a detailed sectional end elevation of one of the motor-driven racks of Figure 5.

Figure 7 is a partial plan view showing in detail the guiding members for the arms shown in Figure 5.

Figure 8 is a schematic illustration of the scoring counter.

Figure 9 is a schematic circuit diagram of the motor reverser and pen actuating circuits.

Figure 11 is a schematic circuit diagram of the scoring counter.

Figure 2:
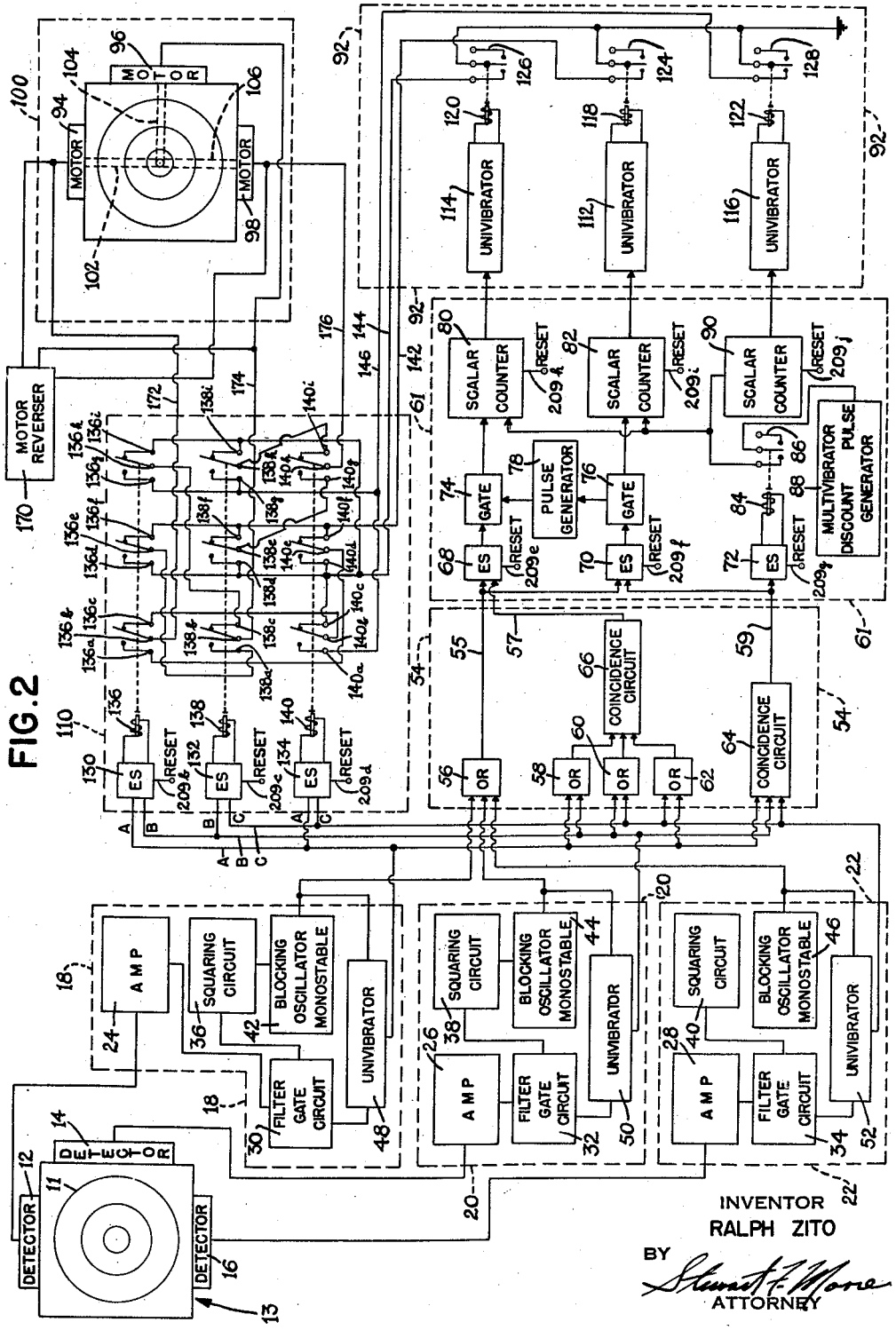
Figure 2 is a block schematic diagram of the time expanding portion of the system.

In Fig. 1 a target generally indicated as 10 is provided with a face 11 having a suitable pattern formed thereon and is located at the remote end of a target firing range. The target pattern may be imprinted on a suitable material such as cloth or paper with a hard surfaced backing member 13, such as a face hardened steel plate, positioned rearwardly adjacent to the target pattern 11. The position of impact of a projectile striking backing member 13 is sensed by a plurality of suitable detectors, and the sensing information is fed to translating unit 15 by means of a suitable length of cable 17. Cable 17 also has a plurality of outlets 19 for additional score indicators which may be placed along the firing range wherever desired.

Backing member 13 is inclined at an angle to the horizontal to direct ricocheting projectiles towards the ground. However, when target pattern 11 as seen from the firing position, is geometrically projected on to inclined backing member 13, the normally circular pattern is distorted into a slightly elliptical shape, which results in negligible errors in determination of the projectile position in a vertical dimension. Therefore, the backing member should be adjusted to an angle which will be a compromise between display distortion and projectile rebound.

Additional targets may be substituted for the target C, shown in Fig. 1, if desired. For example, a twin silhouette target of the type shown in Fig. 1A may be used, or a large bullseye design for long range firing, as shown in Fig. 1B, may be employed.

The electrical mechanism comprising translating unit 15 is shown in block schematic form in Fig. 2. Mounted near the edge of each of two or more sides of member 13 and disposed intermediate the ends of each edge, are sonic detectors 12, 14 and 16 which may be any suitable device capable of generating a signal in response to sonic or supersonic shock waves of the type emitted upon the impact of an object against a hard surface. It has been found that the impact of a bullet against a plate of armor steel will produce wave shapes of the form shown in Fig. 3. Such sonic waves have a very sharply rising front followed by a damped sinusoidal oscillation due to ringing of the impacted surface.

As the initial rise has a frequency in the order of 5 megacycles or greater, it is preferable that detectors 12, 14, 16 be responsive to high frequencies. It has been found that quartz crystals having a natural oscillation frequency of approximately 15 megacycles provide suitable devices responsive to the initial shock impulse when mounted in contact with the impact receiving plate 13. However, other types of sonic detectors, such as magnetostriction devices, may be effectively employed. For example, it has been found that a magnetostriction detector with a nickel rod as the sensing element provides a sonic pickup device with ability to withstand relatively high amplitudes of transmitted shock waves.

The output signal from each detector 12, 14, 16 which designate channels A, B, C, respectively, is received by a corresponding channel amplifier 18, 20, 22. Each channel amplifier has a preamplifier 24, 26, 28, a high pass filter-gate circuit 30, 32, 34 connected to the output thereof and feeding into a squaring circuit 36, 38, 40, which in turn feeds into a monostable blocking oscillator 42, 44, 46. A univibrator 48, 50, 52 is connected between each of the outputs of the monostable blocking oscillators 42, 44, 46, respectively, and the inputs to filter gate circuits 30, 32, 34.

Preamplifier stages 24, 26, 28 are band pass amplifiers whose gains are adjusted so that pulses from their respective detectors 12, 14, 16 are amplified sufficiently to trigger blocking oscillators 42, 44, 46. The gain from these amplifiers, however, is maintained sufficiently low to prevent triggering from spurious vibrations or external noise. Filter-gate circuits 30, 32, 34 also serve to prevent triggering from spurious vibrations. The filters may be adjusted for a relatively high cut-off frequency such as five megacycles or above so that only the sharp, initial shock impulse is fed to the succeeding squaring circuits 36, 38, 40. Low frequency ringing or other disturbances are thereby eliminated and cannot pass to succeeding units as sources of error. The outputs of filter-gate circuits 30, 32, 34 are amplified by squaring circuits 36, 38, 40, thus producing a sharp rise time pulse for triggering monostable blocking oscillators 42, 44, 46, which provide an output of one positive going, short duration pulse for each triggering pulse. The output pulse from each oscillator also triggers its corresponding univibrator 48, 50, 52, each of which in turn supplies a long duration, negative going pulse to cut off and deactivate filter-gate circuits 30, 32, 34. Cutting off the filter-gate circuits prevents further triggering of this circuitry by ringing of the plate 13 or pick up rebound. Channel amplifier units 18, 20, 22 are connected to a pulse time sequence selector and distributor 54.

The impact of a projectile striking the hardened backing surface of target 10 generates a plurality of shock waves which emanate from the point of impact as circular wave fronts traveling in the form of ever-widening circles and at any instant would appear as a plurality of concentric circles with the point of impact at the center thereof. It will be appreciated that unless a point of impact is in the exact center of the target, each detector 12, 14, 16 will receive the initial wave front at a different time. By measuring the time differentials of the pulses received by each of the three detectors, beginning at the instant the first pulse is received by one of the detectors to establish a time basing reference, the exact location of the point of impact may be determined by converting the time relationships into distance measurements.

Pulses received by sequence selector unit 54 from channel amplifiers 18, 20, 22, in a randomly distributed time relationship are separated and distributed to output lines 55, 57, 59 of unit 54 in accordance with a time sequence such that line 55 always receives the first emitted pulse, line 57 always receives the second emitted pulse, and line 59 receives the last pulse, regardless of which detector originally emitted these pulses. Pulse time sequence selector and distributor 54 comprises OR circuits 56, 58, 60 and 62 and coincidence circuits 64 and 66.

An OR circuit as used here and hereinafter in this specification is a buffer circuit having a plurality of inputs adapted to receive pulses either from one input source or another. Such a circuit emits a signal from its output terminals when either a single signal or a plurality of signals are received on its inputs. A conventional OR circuit may comprise merely a junction point for one or more circuits as inputs, the point itself being a single output, or an OR circuit may have one or more electronic tubes so connected that each receives a single input but have their outputs connected in parallel so that one or more input pulses will always provide an output pulse therefrom.

A coincidence circuit as employed in the present invention means a conventional coincidence or gate circuit so adjusted that an output pulse will not be emitted from an electronic circuit having two or more inputs until a pulse has been received on each input. Such a circuit requires not only that a pulse be received by all inputs, but also that all pulses be coincidental in time. In the present invention these circuits are made to function more in the nature of a conventional AND circuit in which the time coincidence requirement is relaxed. This is done by merely lengthening the time constant of the operating pulses fed to the coincidence circuit so that the input pulses overlap in time. Such a circuit may be adapted to operate not only on the reception of a pulse by all inputs, but the reception thereof need not occur simultaneously.

Channel amplifiers 18, 20, 22 are all connected to OR circuit 56. Channel amplifier 18 is connected by means of line A to OR circuits 58, 62 and coincidence circuit 64. Channel amplifier 20 is connected by means of line B to OR circuits 58, 60 and coincidence circuit 64. Channel amplifier 22 is connected by line C to OR circuits 60, 62 and coincidence circuit 64. OR circuits 58, 60, 62 are connected to coincidence circuit 66, which is adapted to emit an output pulse upon reception of two of the three pulses from OR circuits 58, 60, 62.

From each of the three channel amplifiers, two output signals for each pulse input occur simultaneously, a short duration pulse and a long duration pulse. Short duration pulses are supplied to OR circuit 56 from each of the blocking oscillators 42, 44, 46. OR circuit 56, acting as an isolation stage, provides an output upon arrival of each input pulse to line 55. This line always, therefore, transmits the first pulse received from any one of the three channel amplifier circuits.

Long duration pulses from each of the univibrators 48, 50, 52 are fed to lines A, B, C. Because of the arrangement of connections to OR circuits 58, 60, 62 which are actuated by the long duration pulses, line 57 always transmits the second pulse in time sequence, since coincidence circuit 66 emits an output pulse upon reception of the second of three long input pulses. For example, if the time sequence were such that unit 18 emitted the first pulse, unit 22 passed the second pulse, and unit 20 passed the third pulse in time relationship, then the sequence would be A—C—B, and OR circuits 58 and 62 would both feed the pulse on line A simultaneously to coincidence circuit 66, which is thereby placed in an active state ready to emit an output pulse upon reception of a second input pulse. Emission of pulse C, the next successive pulse in time sequence from amplifier 22 causes an output pulse from OR circuits 60 and 62 to be received by coincidence circuit 66, which is triggered thereby and in turn emits a pulse which is transmitted by line 57 as the second pulse in time sequence.

Coincidence circuit 64 transmits an output pulse only upon reception of three input pulses. As lines A, B, and C are connected thereto, only the last of the three pulses received from channel amplifiers 18, 20 and 22 will trigger coincidence circuit 64. Thus the last pulse in time sequence is necessarily transmitted by line 59.

The velocity of sound through a metallic medium is approximately 16,000 feet per second, or about $2 \times 10^5$ inches per second, or $5 \times 10^{-6}$ sec./in. For the average sized target of approximately 6 feet in width, the maximum interval between pulses that could occur is approximately $72 \times 5 \times 10^{-6}$ or 360 microseconds. Such time differentials are entirely too fast to operate associated relay and target facsimile devices. Therefore, the pulses from circuits 56, 64, 66, although sequentially arranged according to time spacing therebetween, are distributed by lines 55, 57, 59 to a pulse time expander 61 which translates the time differentials existing between the first, second and third pulses proportionately by a constant factor "k" to time differentials in the order of magnitudes of tenths of seconds.

Pulse time expander 61 has a plurality of electronic switches 70, 68 and 72 to which are connected pulse lines 55, 57 and 59, respectively. First pulse line 55 is also connected to electronic switch 68 in such a manner that that the transmission of a pulse by line 55 will place switches 68 and 70 in an "on" or activated position. Second pulse line 57 is connected to switch 68 in such a manner as to render it inactive when a pulse is received thereon. Third pulse line 59 is connected to the "off" position of switch 70 in addition to connection to the "on" position of switch 72. The electronic switches as utilized in the present invention may be flip-flop circuits or any other well known type of electronic switch as known to those skilled in the art, and the switching action can be accomplished in various ways.

For purposes of illustration, the switches employed in the present invention will be considered to be flip-flop circuits of the type which are rendered in a conductive state by reception of a pulse and rendered non-conductive by reception of the next succeeding pulse.

Switches 68 and 70 are connected to gates 74 and 76, respectively. A pulse generator 78 is also connected to gates 74 and 76. Gates 74 and 76 are conventional gating circuits of the type which provide output signals representative of signals fed to the input of the gating circuit when a positive gate controlling pulse is properly received by the circuit from a gate controlling source such as flip flop circuits 68, 70. Gating circuits 74 and 76 are connected respectively to conventional scalar counters 80 and 82.

These counters are of the type that record N-1 pulses occurring regularly or at random, but recycle and emit an output pulse when the Nth pulse occurs. Connected to the output of electronic switch 72 is a relay 84. Contacts 86 of relay 84 are in a normally open position, but when closed they connect a discount pulse generator 88, similar in circuitry to pulse generator 78, to scalar counters 80, 82 and 90.

In operation, the first shock wave to actuate a detector is amplified, shaped, and distributed, as described, and fed by line 55 to electronic switch 70, establishing it in the "on" position. Gate 76, accordingly, is opened by actuation of switch 70, allowing pulse generator 78 to feed pulses through gate 76 into counter 82 where they are counted.

Since electronic switch 68 is also connected to the first pulse line 55, it is activated at the instant of passage of the first pulse so as to open gate 74, allowing pulses from pulse generator 78 to pass therethrough and be fed to counter 80. Thus the transmission of the first pulse by line 55 activates counters 80 and 82 simultaneously. Transmission of the second pulse by line 57 to electronic switch 68 renders it inactive, thereby closing gate 74 and stopping the count of pulses by counter 80. A count is recorded by counter 80 representative of the time differential between reception of the first pulse and the second pulse. When the last pulse in time sequence is transmitted through line 59, electronic switch 70 is accordingly turned off by this pulse. This action closes gate 76 which stops the feeding of pulses from generator 78 to counter 82. Counter 82 then stores for the moment a count representative of the time differential between reception of the first and third shock impulse.

The time relationship represented by the two counters is shown in Fig. 4.

The information stored by counters 80, 82 and 90 relating to the time differential existing between the position information pulses must be translated by translator 92 into corresponding time-spaced impulses which actuate apparatus for energizing motors 94, 96 and 98 of target display unit 100, in proper time sequence, as will be hereinafter more fully described.

In general, motors 94, 96 and 98 are mechanically linked to movable arms 102, 104 and 106, respectively, and are adapted to move marking device 159 (Fig. 8), which may include a pen or any other suitable marking means, into marking position. As the third and last pulse to be received from pulse time sequence selector and distributor 54 is emitted from the detector positioned farthest away from the point of a given impact, then the corresponding motor of target display unit 100 must advance its movable arm farther than those of the other motors in time sequence while the motor corresponding to that detector receiving the first shock impulse must be actuated last in order to properly position the marking device 159. Therefore, the time sequence fed to the motor starting units comprising translator 92 and motor sequence selector 110 is inverted by conventional "complementing" of the counters to secure the difference between the count actually stored and some arbitrary number, usually the highest number countable by a selected counter before recycling to zero. The discounting of the counters is performed as follows.

A continuously operating pulse generator is connected through normally open switch contacts of relay 84 to scalar counters 80, 82 and 90. This discount pulse generator 88 and pulse generator 78 are conventional pulse generators of the multivibrator type adapted to feed counting pulses into scalar counters and may be any one of several types well known to those skilled in the art.

Line 59, which deactivated electronic switch 70 as mentioned above, is also connected to electronic switch 72 in such a manner that this switch is actuated thereby when the third pulse is transmitted by line 59. Actuation of switch 72 energizes relay 84, thereby closing contact 86 and allowing discount pulse generator 88 to feed pulses by direct connection to counters 80, 82, 90. All counters immediately begin counting the pulses from generator 88 with counter 90 starting at zero, while counters 80 and 82 resume their counting with the next succeeding count from that last counted when electronic switch circuits 68 and 70 were deactivated. Counter 90 always reads zero initially and serves merely as a constant time delay in establishing an effective "zero time" or reference point.

Counters 80, 82 and 90 are of the type which count a predetermined number of pulses and then recycle to zero when the counters attain the highest number countable thereon. At the time of recycling, an output pulse is emitted from each counter which is fed to univibrators 112, 114 and 116 to activate them by conventional pulse triggering action. The number of counts necessary for recycling of a counter may be arbitrarily set and chiefly depends upon the type of counter utilized, as is well known in the art.

For the purposes of illustration, assume that each counter recycles when 100 pulses have been counted. Then counter 82 will be the first in sequence to recycle since it has stored the highest count, namely the count representing the time interval between T1 and T3 as shown in Fig. 4. The next counter to reach the arbitrary 100 pulses is counter 80 which has stored the count representing the time interval between T1 and T2. Reference or dummy counter 90, having started from zero counts at the instant that counters 80 and 82 resumed counting up to 100, is last in time sequence, so that univibrator 116 is activated lastly.

Univibrators 112, 114 and 116 are of the type which are activated by an incoming pulse and remain self-activated for a period of time dependent on the time constant of the circuit, and then resume a passive or inactive state until another pulse is received. The "on" time of each univibrator is sufficient to activate relays 118, 120 and 122, respectively connected to each univibrator until motor arms 102, 104 and 106 have progressed inwardly a distance sufficient to close start switches 180, 182, 184 shown in Fig. 9.

Activation of each of the univibrators causes its corresponding relay coil to be energized, thus closing in proper time sequence normally open contacts 124, 126 and 128 of relays 118, 120 and 122. Each set of contacts is connected by motor sequence selector 110 to a properly selected motor, to act as activating switches for applying power to each motor in proper time sequence. The motor sequence selector circuit 110 is provided in order that the starting sequence of the several indicator arms actuating motors 94, 96 and 98 corresponds in the proper inverse time relationship to the reception of the impact impulses received by detectors 12, 14 and 16.

Connected to lines A, B and C are electronic switches 130, 132 and 134 which are preferably of the flip-flop type adapted to be activated by a first incoming pulse and deactivated by a second incoming pulse. Connected to the outputs of switches 130, 132 and 134 are relays 136, 138 and 140 respectively. Each relay has a plurality of single pole, double throw contacts adapted to provide selected switching combinations for connecting the contacts 124, 126 and 128 of relays 118, 120, and 122 to motors 94, 96 and 98 in proper order.

For each impact on the target 10, detectors 12, 14 and 16 will be responsive in accordance with one of six possible combinations of sequential reception of impact pulses. As the time sequence arrangement of pulse reception is transmitted by lines A, B and C, flip-flop switches 130, 132 and 134 have their inputs so connected to these lines that their state of activity in conjunction with the interconnections between contacts of relays 136, 138 and 140 will ultimately determine which of motors 94, 96 and 98 is to receive the first, second and third starting pulse. One suitable arrangement for connection of lines A, B and C to electronic switches 130, 132, 134 and connections between the contacts of relays 136, 138, 140 to motors 94, 96, 98 is shown in Fig. 2. A chart showing the six general categories of possible time sequences and condition of each relay 136, 138 and 140 to provide proper activation of each motor is set forth below. When two or more pulses arrive simultaneously, they may be considered as a special case or variation of one of the six general groups.

| Time Sequence | | | Relay Positions | | |
|---|---|---|---|---|---|
| First | Second | Third | Relay 136 | Relay 138 | Relay 140 |
| A | B | C | 0 | 0 | 1 |
| A | C | B | 0 | 1 | 1 |
| B | A | C | 1 | 0 | 1 |
| B | C | A | 1 | 0 | 0 |
| C | A | B | 0 | 1 | 0 |
| C | B | A | 1 | 1 | 0 |

In the chart, energization of each relay is indicated by a "1," whereas a relay remaining in a deactivated state is indicated by a zero. In Fig. 2, relays 136, 138, 140 are shown in a de-energized state.

Operation of the motor sequence selector 110 is as follows: For example, assume that a projectile strikes target 10 at such a position that the shock waves emanating from the point of impact actuated detectors 12, 14 and 16 so that the time sequence of the pulses emitted from amplifiers 18, 20 and 22 is C—A—B. After distribution, expansion and inversion, pulses representing this time sequence should actuate the starting motors in the sequence B—A—C, or the motors should be started in the order 96, 94, 98 respectively.

The first pulse on line C places switch 134 in the "on" position and maintains switch 132 in the "off" position. The second pulse in time relationship on line A turns switch 130 on and turns switch 134 off. The third pulse in time relationship on line B turns switch 130 off and turns switch 132 on, so that the resultant state of relays 136, 138 and 140 is that relay 136 is de-energized, relay 138 is energized, and relay 140 is de-energized.

Line 142 connected to contacts 124 of relay 118 always completes a starting circuit for the first motor to be started. Accordingly, this line is connected through contacts 136e and 136f and through contacts 138a and 138b to motor 96, which is thereby actuated first. Line 144 is connected to contacts 126 of relay 120 and always completes the starting circuit for the second motor to be started. Accordingly, this line is connected through contacts 140b, 140c and 136b, 136c to motor 94 which is started secondly. Line 146 is connected to contacts 128 of relay 122 and always completes the starting circuit for the third motor to be started. Accordingly, this line is connected through 138g, 138h and 140h, 140i to motor 98, the third motor to be started in any sequence. Thus, the proper sequence of motor starting, namely 96, 94, 98, is provided. Any of the other sequences shown in the chart may be similarly traced.

The mechanical arrangement of a suitable remotely positioned score indicator is shown in Fig. 5. The score indicator has a suitable housing 148 with a transparent face 150 on which may be mounted a replaceable paper target or roll of target paper 280 (Fig. 8) with target patterns printed thereon. Arranged about three of the four sides of face 150 are the hit marker drive motors 94, 96, 98, pivotally mounted on housing 148 by means of suitable pivot pins 152, and positioned intermediate of the corners of face 150 in identical disposition with detectors 12, 14, 16 located about the target 10. Linked to each drive motor is one of arms 102, 104, 106 which are urged inwardly by motors 94, 96, 98, respectively, through individual rack and pinion members 156. The drive teeth 154 for the racks which engage pinions 156 are along the bottom edge of each arm as shown in more detail in Fig. 6 and Fig. 8 which illustrate one of the rack and pinion arrangements. A roller 107 is mounted above and in contact with each arm to secure proper engagement of arm teeth 154 with pinion 156. Mounted on the inner end of arm 104 is a pen-stylus 158 actuated by a solenoid 159, shown in detail in Fig. 8. When the solenoid 159 is energized, stylus 158 is urged upwardly against the bottom of the target indicating paper to make a mark thereon for indicating the point of impact.

To insure a positive acting guide for each arm to the target marking position, a guiding mechanism is necessary. One form of suitable guiding mechanism is shown in detail in Figs. 7 and 8. Guide bearings of the sleeve type 160, 162 are mounted on each of the inner ends of arms 102, 106, to slideably support a pair of guide rods 164, 166. One end of each guide rod is rotatably secured to arm 104 by means of a pin 168 to which the pen actuating solenoid 159 may also be mounted. Thus, as each arm 102, 104, 106 is projected inwardly by its individual actuating motor, its freedom of travel is restrained by guide rods 164, 166, and it is urged to the marking position by the co-action of the forces exerted by the inward movement of the remaining arms.

The arms move inwardly to a point determined by the junction of their extended lengths, which in turn is a function of the time differential existing between the starting instants of each drive motor. Solenoid 159 is energized upon electrical connection between contacts mounted on the ends of the arms 102 and 106 which necessarily occurs when all three arms come in contact with each other at a central contact ring 163. This annular ring is concentric with pin 168, but spaced therefrom by an insulating bushing 165. Energization of solenoid 159 causes the pen 158 to mark the facsimile target mounted on face 150. It is understood that target paper 280 need not be inscribed by an inked pen, but any other means for indicating the point of impact may be used. For example, a heated stylus may be substituted for the pen of solenoid 159 and heat-sensitive target paper of the type which changes color over areas where heat is applied may be employed to cover face 150. Then, upon energization of the solenoid 159, pressure of the heated stylus 158 against the heat-sensitive paper will suitably indicate the point of impact.

The operation and circuitry of the indicator marking device and the reversing circuit for the various motors is shown in more detail in Fig. 9. Motor reversing and indicator circuits generally indicated in Fig. 2 as 170 are connected by means of lines 172, 174, 176 to motor sequence selector 110. Each of these lines is indirectly connected through motor sequence selector 110 to relay contacts 124, 126, 128. Therefore, closing of these contacts allows the energizing circuit to each motor to be closed through the normally closed contacts of relay 178. Closing of contacts 124, 126, 128 starts each motor 94, 96, 98 in a forward direction and effectively bypasses or shorts out arm starting switches 180, 182, 184. These switches are mounted on each arm 102, 104, 106 and are in a normally open position when the arms are retracted. However, as soon as the arms begin to progress inwardly the switches are closed and perform the function previously performed by contacts 124, 126, 128. When arms 102, 104, 106 have progressed to the point of mutual contact, an energizing circuit for pen solenoid circuit 159 is completed by electrical connection between the contacts mounted on arms 102, 104, 106.

The contact tip of arm 102, insulated from the body portion by a suitable strip of insulation 161, is connected to one terminal of relay 178 and to one terminal of solenoid 159 through normally closed switches 186, 188, 190. The other terminals of relay 178 and solenoid 159 are connected through a resistor 192 to a source of D.C. voltage. A capacitor 196 is connected to pen solenoid 159 and ground. This capacitor is normally maintained in a charged state by a conventional D.C. supply not shown. Grounding arm 102 through contact with arm 106 connects solenoid 159 and relay 178 to ground. Resistor 192 has a high impedance in comparison to the impedance of solenoid 159 and relay 178 connected in parallel so that condenser 196 discharges therethrough, thereby pulsing solenoid 159 and causing marking stylus 158 to be urged upwardly towards the facsimile target on indicator housing 148. At the same instant, relay 178 is energized, thus causing reversal of motors 94, 96, 98 through closing of contacts 178a—178b, 178d—178e, 178g—178h. Relay 178 is held in an energized position through a holding circuit comprising contacts 178j—178k and stopping switches 198, 200, 202 which are also mounted on arms 102, 104, 106. Thus when the arms have been retracted through reversal of motors 94, 96, 98, switches 198, 200, 202 are opened at the proper point and break the holding circuit of relay 178.

As soon as relay 178 is actuated, relay 204 which serves as a reset relay for all electronic switch and counter circuits is actuated through contacts 178m—178n of reversing relay 178.

Actuation of relay 204 closes a pair of contacts 206 to reset all electronic switches to normal position by grounding the grids of all electronic switches through a slow discharge circuit comprising capacitor 200 and resistor 210. The discharge circuit is connected to reset terminals 209b, c, d, e, f, g, h, i, j (Fig. 2) by a suitable connection from each terminal to terminal 209a. If desired, the electronic switches may be reset manually by means of a switch 208.

In the event that for some reason any of the arms should overrun their course of travel, normally closed microswitches 186, 188, 190 and normally open microswitches 214, 216, 218, all mounted near the extreme outer ends of arms 102, 104, 106 are actuated. Switches 214, 216, 218 close to connect reversing relay 178 to ground, thereby immediately reversing motors 94, 96, 98 while switches 186, 188, 190 open to prevent solenoid 159 from erroneously marking the target.

Figure 10:
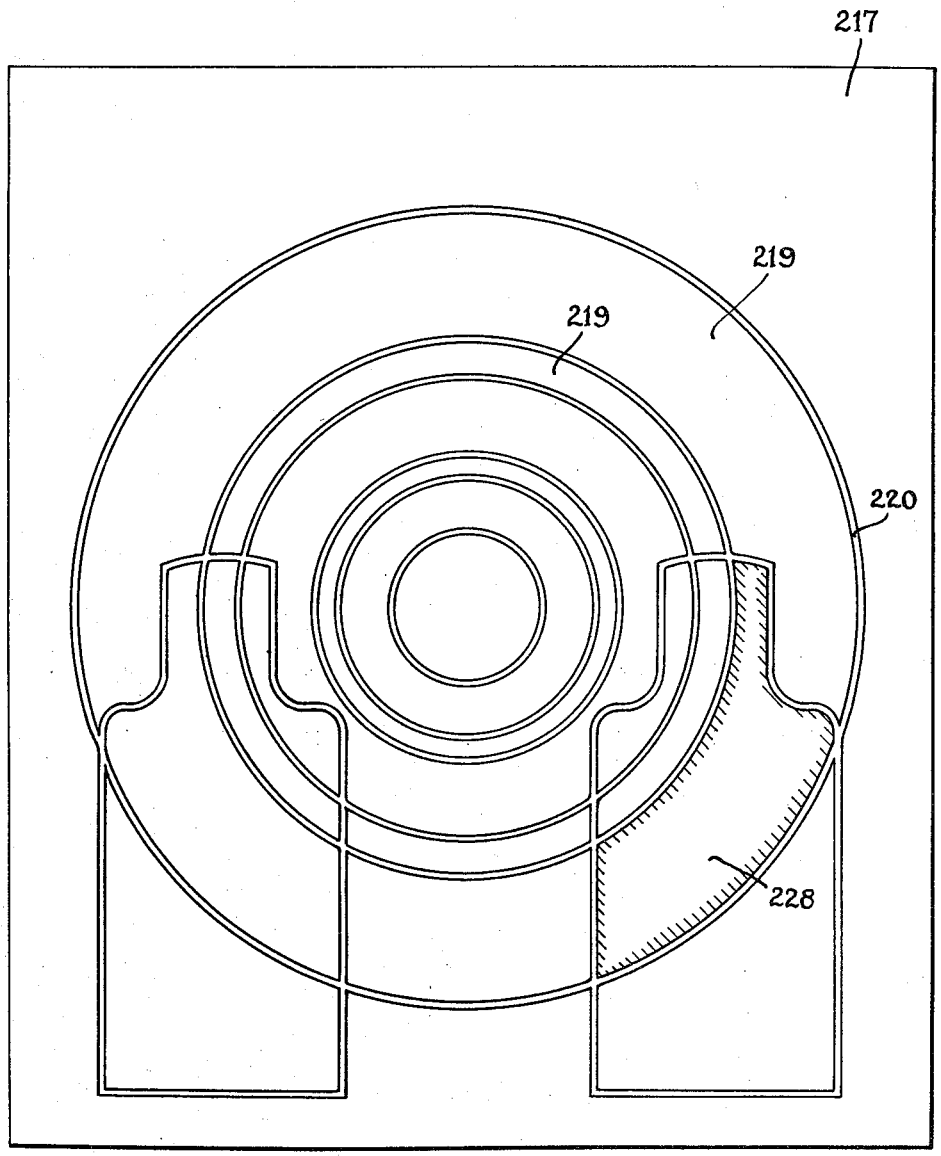
Figure 10 is an illustration of the facsimile target face plate.

In addition to providing the location of each hit upon the target, it is also desirable that the rifleman be provided with a record of the number of times that he has scored a bullseye and, additionally, a record of the total score for each period that the gunner is on the firing line. An embodiment of a suitable scoring mechanism is shown in Figs. 8, 10 and 11. Conventional targets are usually scored by assigning five points for hits in the center or "bulls-eye" area, and four, three and two points, respectively, for a hit in each of the concentrically marked off areas surrounding the center area. Furthermore, for targets of the silhouette type, as shown in Fig. 1A, a score of five is usually assigned for hitting the target within any portion of its marked area. Although it will be understood that other scoring values may be assigned to each area and the scoring device described herein may be adapted to be responsive to a different scoring scheme, for purposes of illustration the above-mentioned scores will be employed.

Directly beneath the inner end of arm 104 and in axial alignment with solenoid actuated pen 158, is mounted an electrical contact arm 212. This arm rides upon a plurality of insulated metallic sectors which, in conjunction with an insulated backing member to which said sectors are secured, comprises plate 217 shown in more detail in Fig. 10. In particular, plate 217 has a number of conducting sectors or segments generally indicated as 219 and so shaped that each segment configuration is separated from another by a small boundary area generally indicated as 220. This boundary area may be air spacing or, if desired, the sectors may be imbedded in an insulating backing member, such as a suitable plastic or Teflon material. It will be seen that the segments are so arranged that compositely they define replicas of each scoring area of the three types of targets illustrated in Figs. 1, 1A, 1B. Plate 217 is mounted directly beneath target paper 280 and in register with the design imprinted thereon. Thus, when pen 158 marks the target paper 280, the end of contact arm 212 is in electrical contact with the identical portion of the target area that pen 158 has marked.

As silhouette targets A and B are always positioned in the lower left and right hand corners of target 10, detectors 12, 14, 16 will respond satisfactorily to hits in these lower areas. Therefore, sector areas for silhouette targets A and B may be included on rider plate 217 as shown in Fig. 10. A separate electrical connection is made to each sector plate 219. These connections comprise a cable 222 which terminates in a target selector switch box 224. It will be appreciated that each of the areas for a selected target which have a similar score value, may be selectively connected together by conventional ganged switching means well known to those skilled in the art so that the output cable 226 from selector switch box 224 may be provided with four conductors which always carry currents representing a hit in one of the four score areas. Of course, each sector plate 219 will have a different value according to the target selected.

By conventional switching interconnections, each plate may be adapted to represent the selected value assigned to it. For example, sector plate 228 has no scoring value when silhouette target A has been selected and fired upon by the rifleman. When silhouette target B has been selected, sector plate 228 has a value of five and is therefore connected; when it comprises a portion of C target, it has a value of two; and when it comprises a portion of D target, it has a value of three.

Relay circuits 230, each responsive to a current representative of each achieved score, are connected to scoring indicator 232 through cable 234 and actuate a plurality of conventional mechanical counters 236, 238, 240, 242, 244, which, respectively, totalize the number of hits in areas assigned the values of two, three and four and the total score achieved during each firing period.

The relay circuits contained in box 230 which actuate the score indicator 232 are shown in schematic detail in Fig. 11. For example, for a firing period of twenty rounds, a score of eighty may have been achieved, consisting of five "twos," six "threes," eight "fours" and four "fives." The four counters would indicate 5, 6, 8, 4 and 80. Pen solenoid 159 is connected to relay circuits 230 by means of cables connecting terminal 244a (Fig. 9) to terminal 244c, and terminal 244b to terminal 244d. When solenoid 159 is energized by the discharge of capacitor 196, the pulse discharge voltage is applied to A.C. impulse type relay 248. Energization of relay 248 closes normally open contacts 248a and 248b, which in turn applies A.C. line voltage through line 246 to rider arm 212. At the instant of energization of relay 248, arm 212 has reached momentarily a stationary position with respect to sector plate 217, so that it is resting upon a sector plate having some arbitrary score value assigned thereto, depending upon the selection of targets A, B, C or D by means of a switch box 224.

Connected to the four scoring value output lines of switch box 224 are four selection relays 250, 252, 254 and 256 respectively, contained in box 230, which are connected to complete a circuit to the A.C. supply source by means of interconnections between contacts 260. These contacts are so interconnected that if the rider arm 212 should happen to stop on the boundary line between the two sectors, although the contact point of arm 212 is sufficiently large to bridge a pair of sectors, yet only the highest sector contacted will have its value score. This is accomplished by providing the next higher scoring relay with contacts which, when actuated, disconnect the return connection for the next lower valued relay. For example, if arm 212 were to rest on the space between a pair of sectors having scoring values three and four, respectively, only relay 254 would be energized. Relay 254 causes contacts 260g and 260h to close, but at the same time opens contacts h and i which are closed when in a normally deenergized position of relay 254. Opening of contacts 260h and 260i breaks the return line for relay 252, thus preventing it from being energized by connection to grounded A.C. supply line 258. In like manner, interconnections between contacts 260 prevent only the highest score to be recorded between sectors having score values two-three or four-five.

When any one of relays 250—256 is energized by impulse relay 248, a holding circuit is closed through a corresponding pair of holding contacts 262, one pair being associated with each relay. The holding circuit is completed by connections between lines 246, 264 and each armature of contacts 262. Energization of any one of relays 250, 252, 254, 256 also energizes its complementary scoring counter relay from relay group 266, 268, 270, 272 through the closing of one pair of normally open contacts 260.

Using the above example, if relay 254 were energized then scoring counter relay 270 would be energized correspondingly through the closing of relay contacts 260g and 260h. Each scoring relay 266, 268, 270, 272 actuates a conventional mechanical counter which registers a hit in an area of designated score value each time it is energized. For example, the counter actuated by relay 272 would count the total number of "fives" achieved during an interval of firing.

To indicate the total score, there is provided a uniselector 274 of the stepping relay type and a total score relay 276 which actuates and advances a conventional mechanical scoring indicator. Uniselector 274 has six banks of contacts indicated as 274a, b, c, d, e, f. When relay 248 is closed upon energization of pen solenoid 159, line voltage is applied to one terminal of uniselector relay coil 274 through contact 0 of contact bank 274e. The other terminal of relay coil 274 is connected to A.C. line 258 through its own normally closed breaker points 278. As all of the contact positions of bank 274e are connected together and to A.C. input line 246, with the exception of contact 0, the pulsing of uniselector 274 by momentary closing of contacts 248a and 248b will cause it to advance each wiping arm of the several contact banks one position and will therefore hold itself closed when wiping arm of bank 274e engages contact position No. 1. Uniselector 274 will then advance itself in step-wise fashion from positions 1 through 9 with a short pause at each position since breaker points 278 momentarily break the circuit upon each energization of uniselector relay coil 274.

Score counting relay 276 has one terminal connected to A.C. line 246 and the other terminal is connected through one of selectively energized contact banks 274a—274d to line 258 when a selected pair of normally open contacts 260 are closed. The contacts of banks 274a—274d are sufficiently spaced so that progression of each wiping arm from one contact to another momentarily opens the circuit to counting relay 276. Thus the mechanical counter is allowed to recover between contact advancements so that it counts each advancing step as an individual count. If, for example, relay 254 were energized, indicating a hit in the "four" area, contacts 260g and 260h would close, thereby applying line voltage from line 258 to individual scoring counter 270 and also applying line voltage to bank 274c. As stepping relay 274 advances, total scoring counter relay 276 will receive four separate impulses from bank 274c and will thus record them as additions to the previously recorded total.

Bank 274f provides a switch for releasing the holding contacts 262 of counter selector relays 250—256. Bank 274f has nine of its switching positions connected to lines 246 and 264 with its zero or resting position unconnected.

In operation, when uniselector relay 274 is pulsed by energization of relay 248, the contact wiping armature of bank 274f advances one step past zero position and supplies holding current through contacts 262 to the one relay of group 250—256 which was energized on the initial impulse from relay 248. A selected pair from the group of holding contacts 262 pass holding current to the energized selector relay during the period that uniselector relay 274 is advancing banks 274a—274f through its nine positions. When the tenth or zero resting position is reached, the holding circuit to bank 274f is opened so that the activated selector relay from group 250—256 and the activated scoring counter relay from group 266—272 are de-energized, and the scoring mechanism returns to an inactive state, ready for the reception of another marking and scoring pulse. At the end of a firing period, all of the individual score counters and the total score counter are reset to zero either mechanically or by conventional relay resetting means. As the counters are a conventional type with normal resetting means, a reset feature is not described herein in detail.

I claim:

1. A system for remotely indicating the position of a point of impact on a target area comprising means for translating the distances between said point of impact and a plurality of selected positions on said target area into respective time intervals representative of said distances, and means operable in response to the differential magnitudes of said time intervals for actuating a device for remotely indicating the position of said point of impact.

2. A system for remotely indicating the position of a point of impact on a target area comprising means for translating the distances between said point of impact and a plurality of selected positions on said target area into respective time intervals representative of said distances, means for proportionally expanding the magnitudes of said time intervals, and means operable in response to the differential magnitudes of said expanded time intervals for actuating a device for remotely indicating the position of said point of impact.

3. A system for remotely indicating the position of a point of impact on a target area comprising a plurality of detectors responsive to shock waves emanating from said point of impact on said target area, each of said detectors having means for emitting an electrical pulse upon reception of the first shock wave from said point of impact, means responsive to said pulses for generating corresponding output signals having time intervals between said signals expanded in proportion to the time intervals between said pulses, and means selectively responsive to the differential magnitude of said time intervals defined by the occurrence of said output signals for actuating an indicator for visually indicating the position of said point of impact.

4. A system for remotely indicating the position of a point of impact on a target area comprising a plurality of detectors responsive to shock waves emanating from said point of impact on said target area, each of said detectors having means for emitting an electrical pulse upon reception of the first shock wave from said point of impact, means responsive to said pulses for generating corresponding output signals having time intervals expanded in proportion to the time intervals between said impulses, means selectively responsive to the differential magnitude of said time intervals defined by the occurrence of said output signals for actuating a visual indicator of the position of said point of impact, and means operable each time said visual indicator is actuated for registering a designated scoring value of each impact.

5. A system for remotely indicating the position of a point of impact on a target area comprising a plurality of detectors responsive to shock waves emanating from said point of impact on said target area, each of said detectors having means for emitting a first electrical pulse upon reception of the first shock wave from said point of impact, second pulse generating means responsive to said first pulses for generating a plurality of groups of pulses representative of the time spaced intervals between said first pulses, memory means for remembering the numerical quantity of pulses in each group, means for translating said remembered quantities of pulses into time spaced signals having spacings proportional to the numerical difference between said quantities of remembered pulses, the time spacing between said signals being lengthened proportionally to the time intervals between corresponding first named pulses, and means selectively responsive to the differential magnitude of said time intervals defined by the occurrence of said time spaced signals for actuating an indicator for visually indicating the position of said point of impact.

6. The system defined in claim 3 wherein each of said pulse emitting means includes a high pass filter for attenuating all frequencies substantially below five megacycles, whereby only the initial steep wave front portion of said shock wave is fed to said time expanding means.

7. A system for remotely indicating the position of a point of impact on a target area comprising a plurality of detecting means responsive to shock waves emanating from said point of impact on said target area, each of said detecting means having means for emitting an electrical pulse upon reception of the first shock wave from said point of impact, a pulse sequence distributor connected to said detectors and operative to arrange said pulses for distribution in a pulse train sequence, the sequential order of said pulses corresponding to the order of arrival of said pulses from said detectors, time expanding means connected to said pulse distributor for generating corresponding output signals having time intervals expanded in proportion to the time intervals between said pulses, and means operable in response to the differential magnitudes of said time intervals for actuating a device for remotely indicating the position of said point of impact.

8. A system for remotely indicating the position of a point of impact on a target area comprising a plurality of detectors responsive to shock waves emanating from said point of impact on said target area, each of said detectors having means for emitting a first electrical pulse upon reception of the first shock wave from said point of impact, said emitting means including means for amplifying, filtering and sharpening said pulses emitted from said detectors, means triggered by said sharpened first pulses for generating output pulses of relatively long and short duration each time said second named means is triggered by said first named means, switching means actuated by said short pulse for rendering said amplifier inoperative for a period of time substantially greater than the duration of said shock wave to prevent amplification of spurious pulses occurring after said initial shock wave pulse, means for sequentially arranging and distributing each of said long pulses, means connected to said separating and distributing means and responsive to said long pulses for generating corresponding output signals having time intervals between said signals expanded proportionately to the time intervals between said long pulses, and means selectively responsive to the differential magnitude of said time intervals defined by the occurrence of said output signals for actuating an indicator for visually indicating the position of said point of impact.

9. The system defined in claim 8 wherein said long and short pulse generating means comprises a blocking oscillator triggered by said sharpened first pulses from said detector.

10. A system for remotely indicating the position of a point of impact on a target area comprising a plurality of detectors responsive to shock waves emanating from said point of impact on said target area, each of said detectors having means for emitting a pulse upon reception of the first shock wave from said target, channels for receiving said pulses, pulse distributing means connected to said detector for arranging each of said pulses in accordance with the time sequence in which said pulses are emitted from said detectors and distributing said arranged pulses to corresponding channels, means operable in response to said channeled pulses for generating corresponding output signals having time intervals between said signals expanded in proportion to the time interval between said pulses and means selectively responsive to the differential magnitude of said time intervals defined by the occurrence of said output signals for actuating a remote impact position indicating device.

11. A system for remotely indicating the position of a point of impact on a target area comprising a plurality of detecting means responsive to shock waves emanating from said point of impact on said target area, each of said detecting means having means for emitting an electrical pulse upon reception of the first shock wave from said point of impact, a pulse sequence distributor connected to said detectors for sequentially arranging and distributing said pulses in accordance with the time spacing therebetween, said pulse sequence distributor comprising a first channel connected to the outputs of said detectors for receiving the first of said emitted pulses and emitting a corresponding output signal, a second channel connected to the output of said detectors for selecting the second of said emitted pulses, said second channel including a coincidence circuit having means for emitting an output signal only when two pulses are received by said coincidence circuit, a third channel connected to said detectors for selecting the third of said emitted pulses, said third channel comprising a coincidence circuit having means for emitting an output signal only when three pulses are received by said coincidence circuit, and means connected to said channels for generating output pulses corresponding to the signals received from said channels, said output pulses having time intervals expanded in proportion to the time intervals between said channel signals and means selectively responsive to the differential magnitude of said time intervals defined by the occurrence of said output pulses for actuating an indicator for visually indicating the position of said point of impact.

12. A system for remotely indicating the position of a point of impact on a target area comprising a plurality of detecting means responsive to shock waves emanating from said point of impact on said target area, each of said detecting means having means for emitting an electrical impulse upon reception of the first shock wave from said point of impact, an impulse sequence distributor connected to said detectors for sequentially arranging and distributing said impulses according to a predetermined order of arrival of said impulses, time expanding means connected to said distributor for generating corresponding signals having time intervals between said signals expanded in proportion to the time intervals between said impulses, said time expanding means comprising three scalar counters adapted to emit an output signal after counting a predetermined number of pulses, a pulse generator, first and second gating circuits, each gating circuit being electrically interposed between said pulse generator and one of said counters, means for causing the first of said pulses from said sequence distributor to open said first gate and the second of said pulses to close said first gate, whereby a first group of pulses from said generator representative of the time spacing between said first and second impulses are counted by one of said counters, means for causing the first of said pulses from said sequence distributor to open said second gate and the third of said pulses to close said second gate, whereby a second group of pulses from said generator representative of the time spacing between said first and third impulses are counted by the second of said counters, a second pulse generator, and means responsive to said third impulse from said sequence distributor for connecting said second pulse generator to said counters whereby said counters are filled up to said predetermined number of pulses by said second pulse generator, and means selectively responsive to the differential magnitude of said time intervals defined by the occurrence of said output signals successively emitted when said counters are filled for actuating an indicator for visually indicating the position of said point of impact.

13. A system for remotely indicating the position of a point of impact on a target area comprising a plurality of detecting means responsive to shock waves emanating from said point of impact on said target area, each of said detecting means having means for emitting an electrical impulse upon reception of the first shock wave from said point of impact, an impulse sequence distributor connected to said detectors for sequentially arranging and distributing said impulses according to a predetermined order of arrival of said impulses, said impulse sequence distributor comprising a first channel connected to the outputs of said detectors for receiving the first of said emitted impulses and emitting a corresponding output signal, a second channel connected to the output of said detectors for selecting the second of said emitted impulses, said second channel including a coincidence circuit having means for emitting an output signal only when two impulses are received by said coincidence circuit, a third channel connected to said detectors for selecting the third of said emitted impulses, said third channel comprising a coincidence circuit having means for emitting an output signal only when three pulses are received by said coincidence circuit, time expanding means connected to said distributor for generating signals having time intervals between signals expanded in proportion to the time intervals between said impulses, said time expanding means comprising three scalar counters adapted to emit an output signal after counting a predetermined number of pulses, a pulse generator, first and second gating circuits, said first channel being connected to said first and second gating circuits and said second channel being connected to said first gating circuit, each gating circuit being electrically interposed between said pulse generator and one of said counters, means for causing the first of said pulses from said first channel to open said first gate and the second pulse from said second channel to close said first gate whereby a first group of pulses from said generator representative of the time spacing between first and second impulses are counted by one of said counters, means for causing the pulse from said first channel to open said second gate, said third channel being connected to said second gate in such a manner that pulses from said third channel close said second gate, whereby a second group of pulses from said generator representative of the time spacing between said first and third impulses are counted by the second of said counters, a second pulse generator, and means responsive to said third impulse from said third channel for connecting said second pulse generator to said counters whereby said counters are filled up to said predetermined number of pulses by said second pulse generator, and means selectively responsive to the time intervals between said signals established when said counters are filled for actuating an indicator for visually indicating the position of said point of impact.

14. A system for remotely indicating the position of a point of impact on a target area comprising a plurality of detectors responsive to shock waves emanating from said point of impact on said target area, each of said detectors having means for emitting an electrical impulse upon reception of the first shock wave from said point of impact, means responsive to said impulses for generating corresponding output signals having time intervals between said signals expanded in proportion to the time intervals between said impulses, a visual indicator for visually indicating the position of said point of impact, said indicator having a plurality of driving means for positioning said indicator, means operable in response to the time intervals between said detector impulses for conditioning each driving means for sequential actuation by said time expanding means, and means for actuating each of said driving means respectively in response to the differential magnitude of said time intervals defined by the occurrence of said output signals.

15. A system for remotely indicating the position of a point of impact on a target area comprising a plurality of detectors mounted in equally spaced disposition about the sides of said target and responsive to shock waves emanating from said point of impact on said target, each of said detectors having means for emitting an electrical impulse upon reception of the first shock wave from said point of impact, means responsive to said impulses for generating corresponding output signals having time intervals between said signals expanded in proportion to the time intervals between said impulses, a visual indicator for visually indicating the position of said point of impact, said indicator having a plurality of driving means disposed about the perimeter of said indicator to correspond with the disposition of said detectors about the sides of said target, means for actuating each of said driving means respectively in response to the differential magnitude of said time intervals defined by the occurrence of said output signals, and switching means connected between said actuating means and said driving means operable in response to the time intervals between said detector impulses for selectively interconnecting said actuating means to said driving means so that said driving means are actuated in inverse order of sequence in which said impulses are emitted by said detectors.

16. A system for remotely indicating the position of a point of impact on a target area comprising a plurality of detectors responsive to shock waves emanating from said point of impact on said target area, each of said detectors having means for emitting an electrical impulse upon reception of the first shock wave from said point of impact, means responsive to said impulses for generating corresponding output signals having time intervals between said signals expanded in proportion to the time intervals between said impulses, a visual indicator including a facsimile of said target for visually indicating the position of said point of impact, said indicator having a plurality of driving means for positioning said indicator, means selectively responsive to the differential magnitude of said time intervals defined by the occurrence of said output signals for actuating said driving means, said indicator including means for permanently recording the position of said point of impact.

17. The system defined in claim 13 wherein said visual indicator includes a plurality of laterally movable members adapted to be urged inwardly towards each other by said driving means, whereby said point of impact is indicated by the point of tangency of said members.

18. The system defined in claim 14 wherein said recording means includes means mounted on one of said members for permanently inscribing the position of said impact on said facsimile.

19. The system defined in claim 17 wherein said driving means includes reversing means operable when said members abut one another at said tangent point whereby said members are retracted and conditioned for indicating the position of further impacts on said target.

References Cited in the file of this patent

UNITED STATES PATENTS

| | | |
|---|---|---|
| 638,986 | Pein | Dec. 12, 1899 |
| 865,604 | Meyer | Sept. 10, 1907 |
| 966,361 | Rose | Aug. 2, 1910 |
| 2,108,919 | Grigoriu | Feb. 22, 1938 |
| 2,434,644 | Fairweather | Jan. 20, 1948 |
| 2,535,255 | Barnes | Dec. 26, 1950 |
| 2,587,715 | Fairchild et al. | Mar. 4, 1952 |
| 2,611,023 | Dunn | Sept. 16, 1952 |
| 2,628,836 | Gangel | Feb. 17, 1953 |
| 2,629,082 | Hare | Feb. 17, 1953 |

OTHER REFERENCES

"Popular Mechanics," for April 1943; p. 5 cited.